(12) United States Patent
Yen

(10) Patent No.: US 7,038,755 B2  
(45) Date of Patent: May 2, 2006

(54) METHOD FOR FABRICATING AN LC PANEL HAVING M×N PANEL PATTERNS AND 2M+2N SEAL PATTERNS

(75) Inventor: Jung-Li Yen, Taipei (TW)

(73) Assignee: Arima Computer Corporation, Taipei (TW)

( * ) Notice: Subject to any disclaimer, the term of this patent is extended or adjusted under 35 U.S.C. 154(b) by 102 days.

(21) Appl. No.: 10/910,741

(22) Filed: Aug. 3, 2004

(65) Prior Publication Data

US 2006/0028607 A1    Feb. 9, 2006

(51) Int. Cl.
    *G02F 1/1339* (2006.01)
(52) U.S. Cl. ............................... 349/153; 349/190
(58) Field of Classification Search .......... 349/153, 349/190

See application file for complete search history.

(56) References Cited

U.S. PATENT DOCUMENTS

| 6,906,772 B1 * | 6/2005 | Kim .................. 349/153 |
| 2003/0107699 A1 * | 6/2003 | Jung et al. ............. 349/153 |
| 2004/0105065 A1 * | 6/2004 | Jung et al. ............. 349/153 |
| 2004/0160566 A1 * | 8/2004 | Kawabe et al. ......... 349/153 |
| 2005/0094086 A1 * | 5/2005 | Lee et al. .............. 349/153 |

* cited by examiner

*Primary Examiner*—Tarifur R. Chowdhury  
(74) *Attorney, Agent, or Firm*—Volpe and Koenig, P.C.

(57) ABSTRACT

A method for fabricating a liquid crystal (LC) panel is provided. The method mainly limits the distance λ between each of the small panel patterns and each of the gasket seal patterns to $0<\mu<0.25$ mm, so as to eliminate the deformation on the periphery of the large LC panel, coming up in the small panel on the periphery of the large LC panel after the small LC panels are segmented from the large LC panel.

17 Claims, 11 Drawing Sheets

METHOD FOR FABRICATING AN LC PANEL HAVING M×N PANEL PATTERNS AND 2M+2N SEAL PATTERNS

FIELD OF THE INVENTION

The present invention relates to a method for fabricating a liquid crystal (LC) panel, and more specifically, to a method for fabricating the small LC panel applied to a mobile phone.

BACKGROUND OF THE INVENTION

With the proceeding of modern manufacturing technologies, a liquid crystal display (LCD) has been in widespread use. The operation principles of the LCD are that using an electric field to control the arrangement of liquid crystal molecules and displaying brilliant or dark images by the beams of the backlight which have passed the liquid crystal molecules or not. The process quality of the small LC panel applied to a mobile phone especially has an obvious influence over the performance of the mobile phone and how the user feels.

Please refer to FIG. 1 (a) to FIG. 1 (d), which shows a method for fabricating an small LC panel according to the prior art.

Firstly, as shown in FIG. 1 (a), a large backplane 10 is provided. There are a plurality of gasket seal patterns 102 and small panel patterns 101 which are formed by a screen printing process and arranged as an array on the backplane 10.

Secondly, as shown in FIG. 1 (b), a mixture including a gasket seal is then coated on the gasket seal patterns 102 of the backplane 10 to form a side frame 11, including at least one slit 12, to surround the periphery of the small panel patterns 101. A curing process is performed to reinforce the hardness of the side frame 11.

Thirdly, as shown in FIG. 1 (c), a gasket seal is then coated on the side frame 11. By performing a lamination process, a transparent conductive layer 13, including indium tin oxide (ITO), is laminated on the backplane 10. A liquid crystal filling (LC filling) process is then performed to fill a cell gap between the backplane 10 and the transparent conductive layer 13 with liquid crystal.

Then, as shown in FIG. 1 (d), another substrate 14 which is the same with the backplane 10 is provided and laminated on the structure shown in FIG. 1 (c). An end sealing process is performed to seal the slit 12 so as to form a large LC panel 15.

Finally, a realignment process is performed toward the large LC panel 15. According to the small panel patterns 103 on the large LC panel 15, a plurality of small LC panels 16 are formed by segmenting the large LC panel 15.

However, the small LC panels 16 manufactured in the above process sometimes have the defect of bad tones of colors. That is, it is easy to observe the yellow light reflected on the small LC panels 16 which is power-off with a naked eye. Moreover, the defect of bad tones of colors most seriously affect the quality of displaying of the small LC panels 16 while they are power-on.

To solve the problem, several solutions provided with limited effects only focus on the adjustment of the lamination process between the substrate 14 and the backplane 10. That is to say, to improve the yield by adjusting the inaccuracy of the lamination process between the substrate 14 and the backplane 10. Although those solutions are effective only toward the small LC panels 103 of the central portion on the substrate 14, the small LC panels 105 of the most peripheral portion on the substrate 14 still have the defect. Namely, the defect of bad tones of colors which lead to the phenomenon of yellow light are still waiting to be solved.

It is therefore attempted by the applicant to deal with the above situation encountered in the prior art.

SUMMARY OF THE INVENTION

It is the main object of the present invention to provide a method for fabricating a liquid crystal panel. The distance between the small panel patterns and the gasket seal patterns on the large LC panel is increased to reinforce the ability of the large LC panel against the unbalanced stress resulted from the lamination process of the large LC panel, so as to eliminate the phenomenon of yellow light of the small LC panels after segmentation and to improve the yield of the small LC panels.

It is another object of the present invention to provide a method for fabricating a liquid crystal (LC) panel, including steps of: (a) providing a first substrate and a second substrate respectively having m×n panel patterns and 2m+2n gasket seal patterns thereon, wherein a frame is formed by the gasket seal patterns to surround the panel patterns, the frame has m the gasket seal patterns in length and n the gasket seal patterns in width, and there is a distance $\mu$ between each of the gasket seal patterns and each of the panel patterns adjacent to the gasket seal patterns where $0<\mu<0.25$ mm; (b) forming a side frame on the frame; (c) forming a transparent conductive layer on the first substrate; (d) filling a gap between the first substrate and the transparent conductive layer with a liquid crystal; (e) placing the second substrate over the transparent conductive layer to form a first LC panel; and (f) segmenting the first LC panel according to each of the panel patterns to form m×n second LC panels.

It is further an object of the present invention to provide a pattern disposition for a substrate of an LC panel, including: m×n panel patterns; and 2m+2n gasket seal patterns, wherein a frame is formed by the gasket seal patterns to surround the panel patterns, the frame has m the gasket seal patterns in length and n the gasket seal patterns in width, and there is a distance $\mu$ between each of the gasket seal patterns and each of the panel patterns adjacent to the gasket seal patterns where $0<\mu<0.25$ mm.

Preferably, the first substrate and the second substrate are both made of silicon.

Preferably, m and n are both positive integrals, and m is greater than n.

Preferably, the panel patterns and the gasket seal patterns are formed by a screen printing process.

Preferably, a rectangle is formed with all the panel patterns, and the rectangle is m the panel patterns in length and n the panel patterns in width.

Preferably, the side frame in the step (b) has at least one slit for filling the liquid crystal.

Preferably, the step (e) includes sealing the slit to form the first LC panel after placing the second substrate over the transparent conductive Preferably, the step (b) includes performing a lithography process with a photoresist to form the side frame.

Preferably, between the step (b) and the step (c) further includes a step of: curing the side frame to reinforce a hardness thereof.

Preferably, the transparent conductive layer is made of indium tin oxide (ITO).

Preferably, between the step (c) and the step (d) further includes a step of: forming a gasket seal on the side frame.

Preferably, between the step (e) and the step (f) further includes a step of: realigning the liquid crystal which is filled in the first LC panel.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1A:
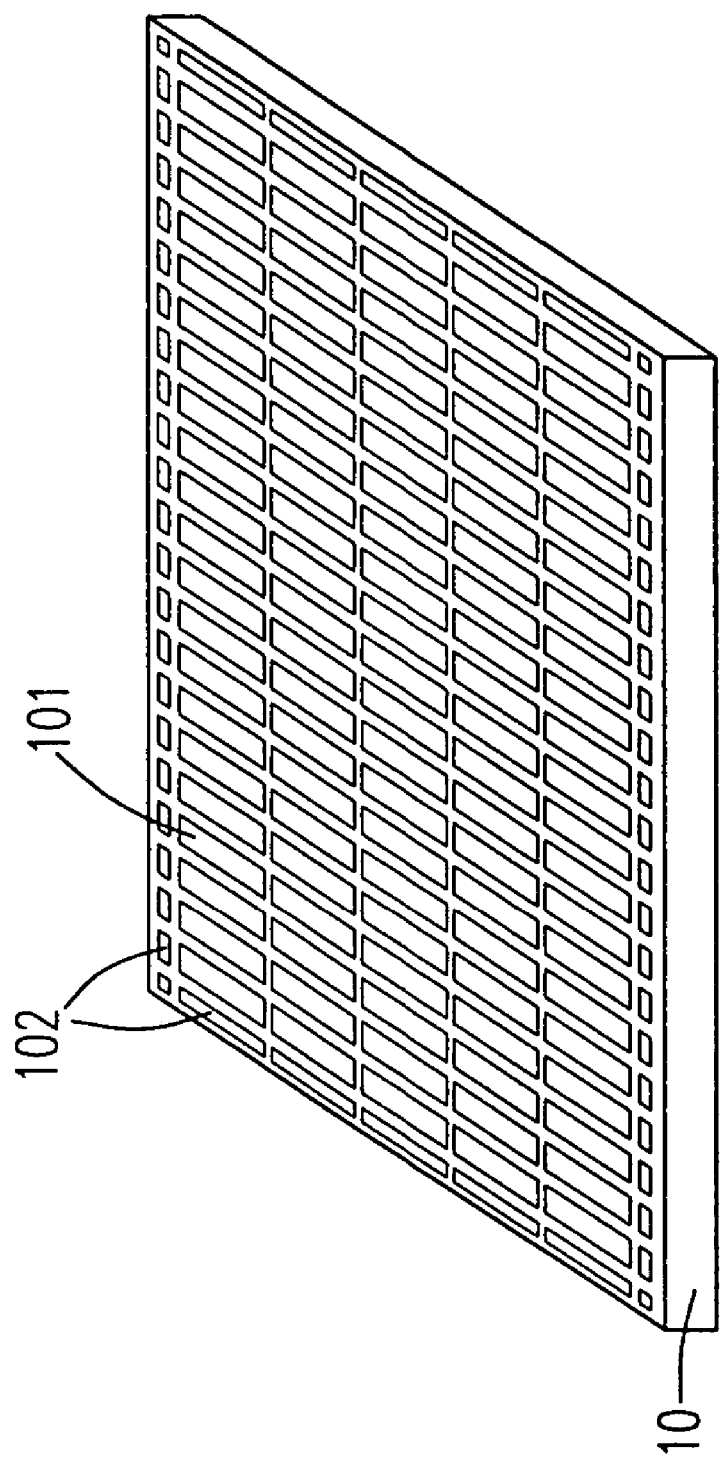
FIG. 1 (a)~(d) are side views of fabricating small LC panels according to the prior art.
Figure 1B:
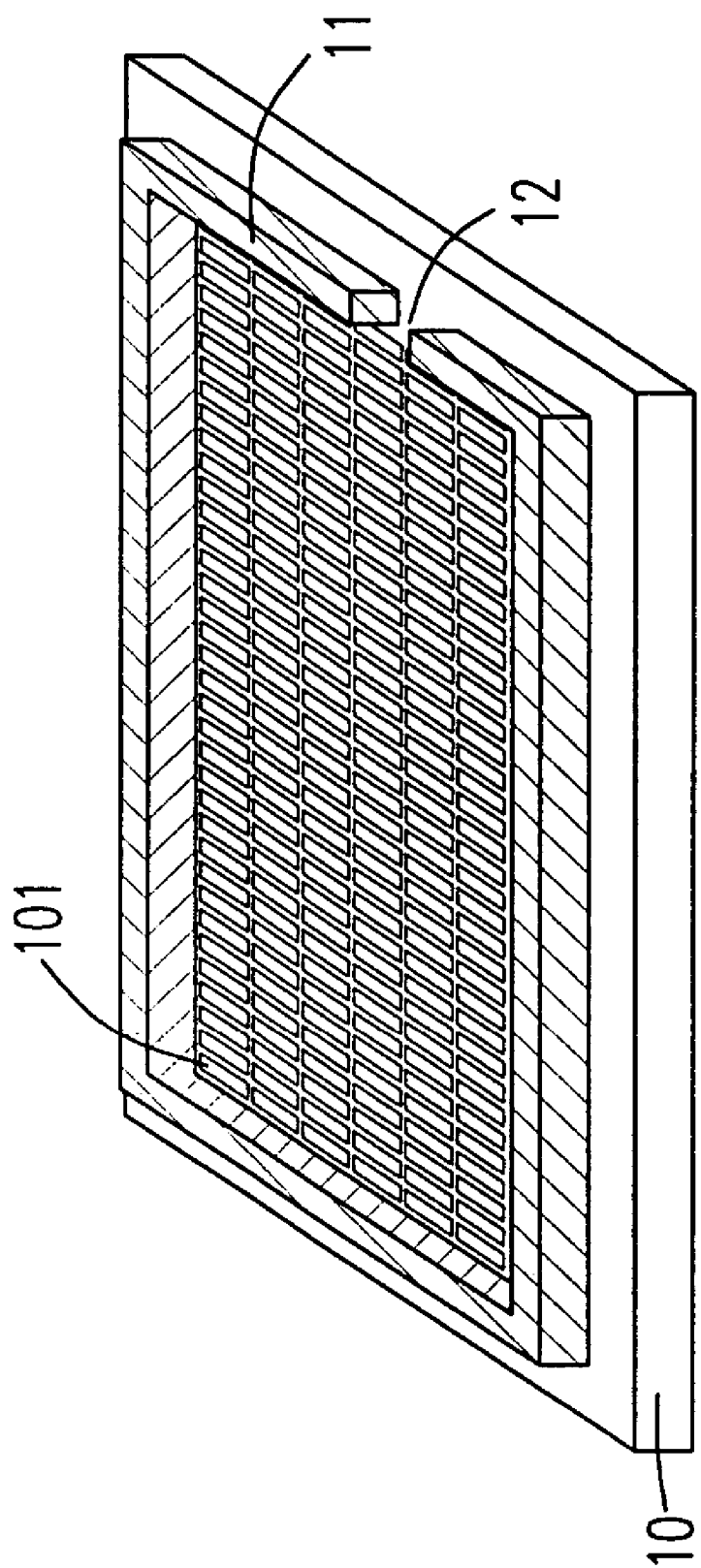
Figure 1C:
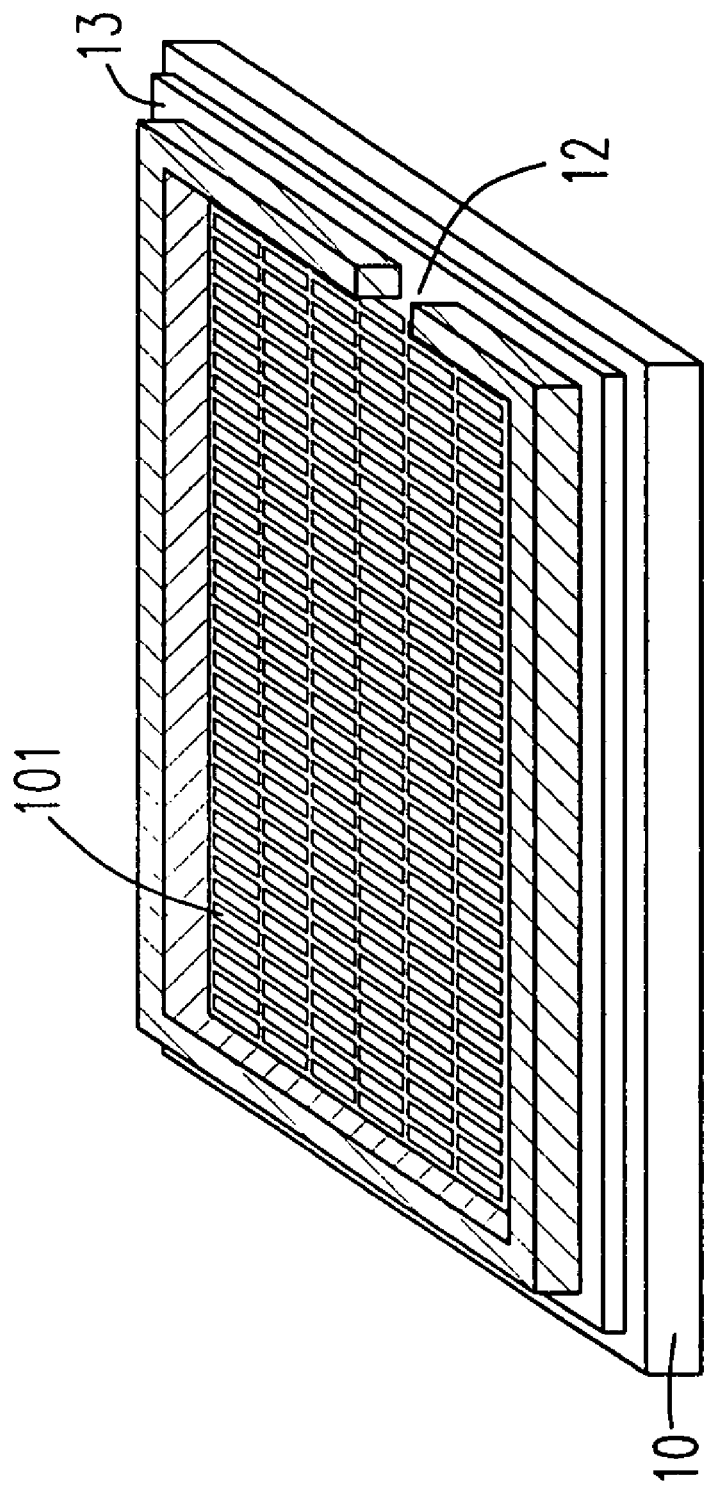
Figure 1D:
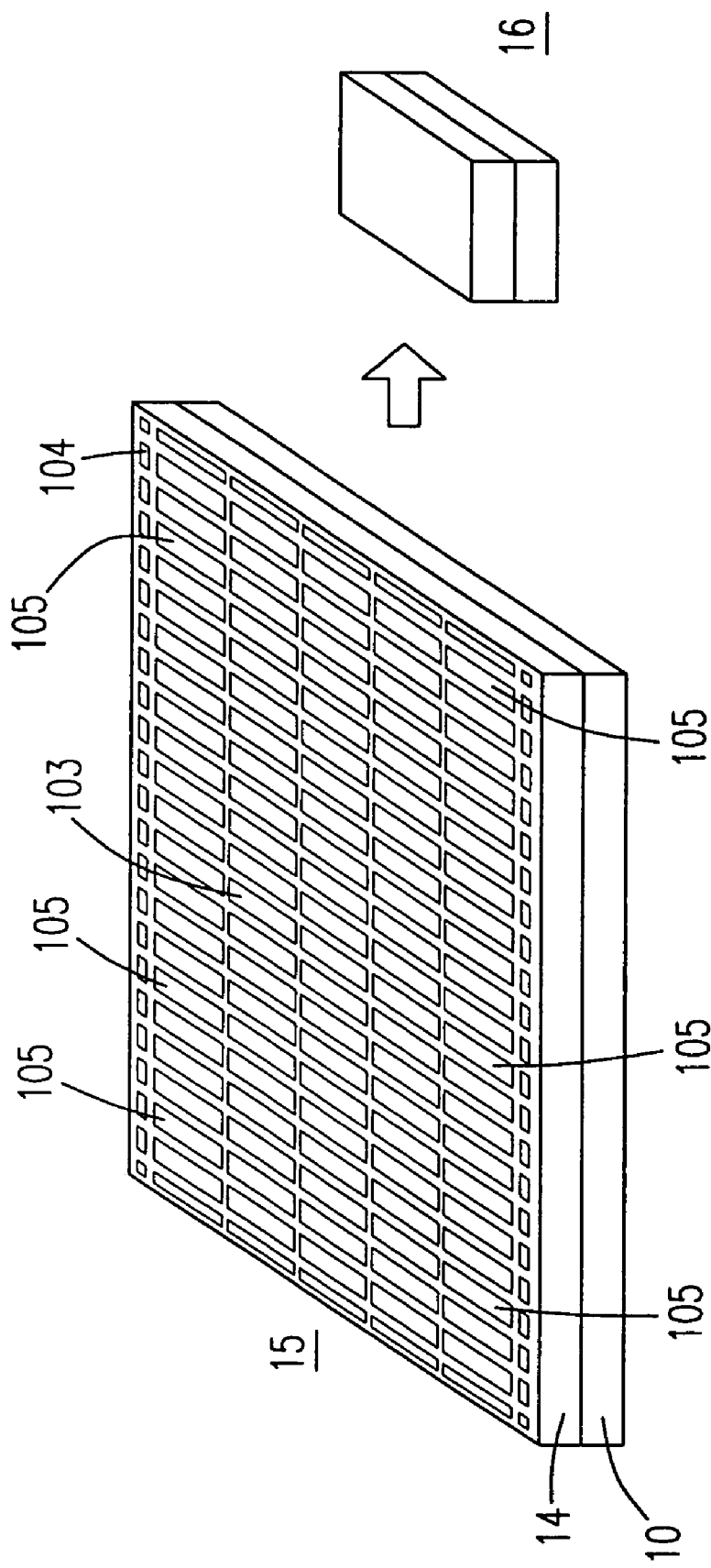
Figure 2:
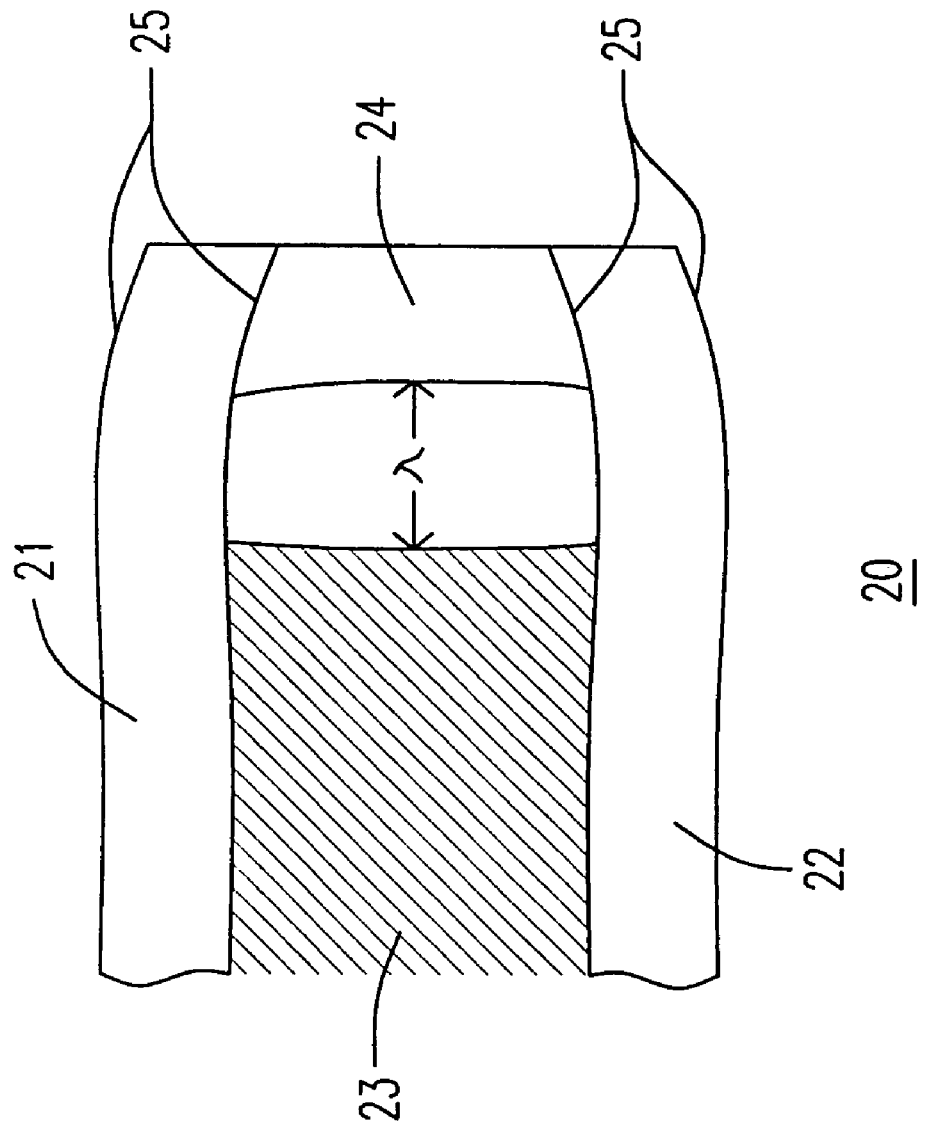
FIG. 2 is a cross-section view of the periphery of a large LC panel according to the prior art.
Figure 3A:
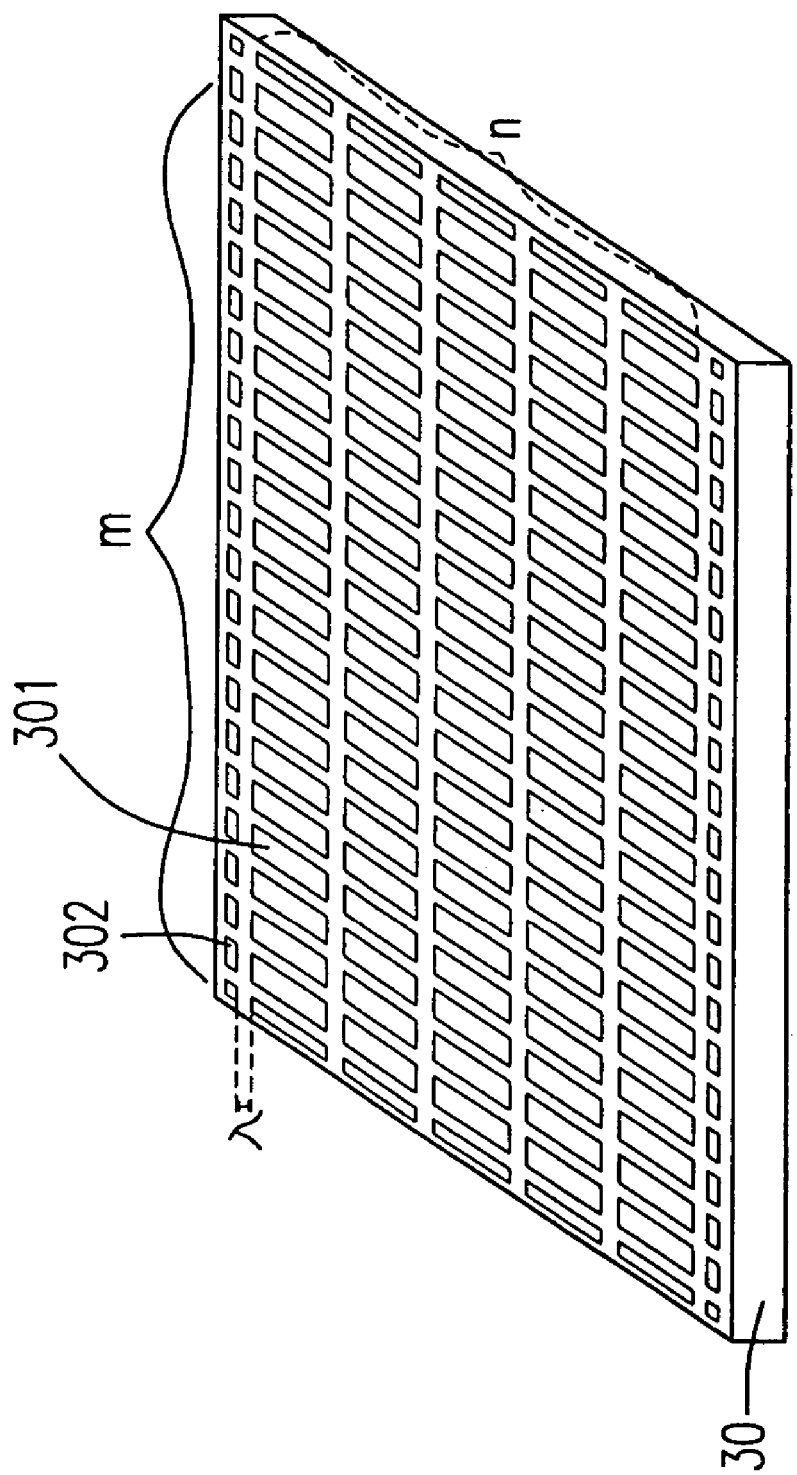
FIG. 3 (a)~(d) are side views of fabricating small LC panels according to the present invention.
Figure 3B:
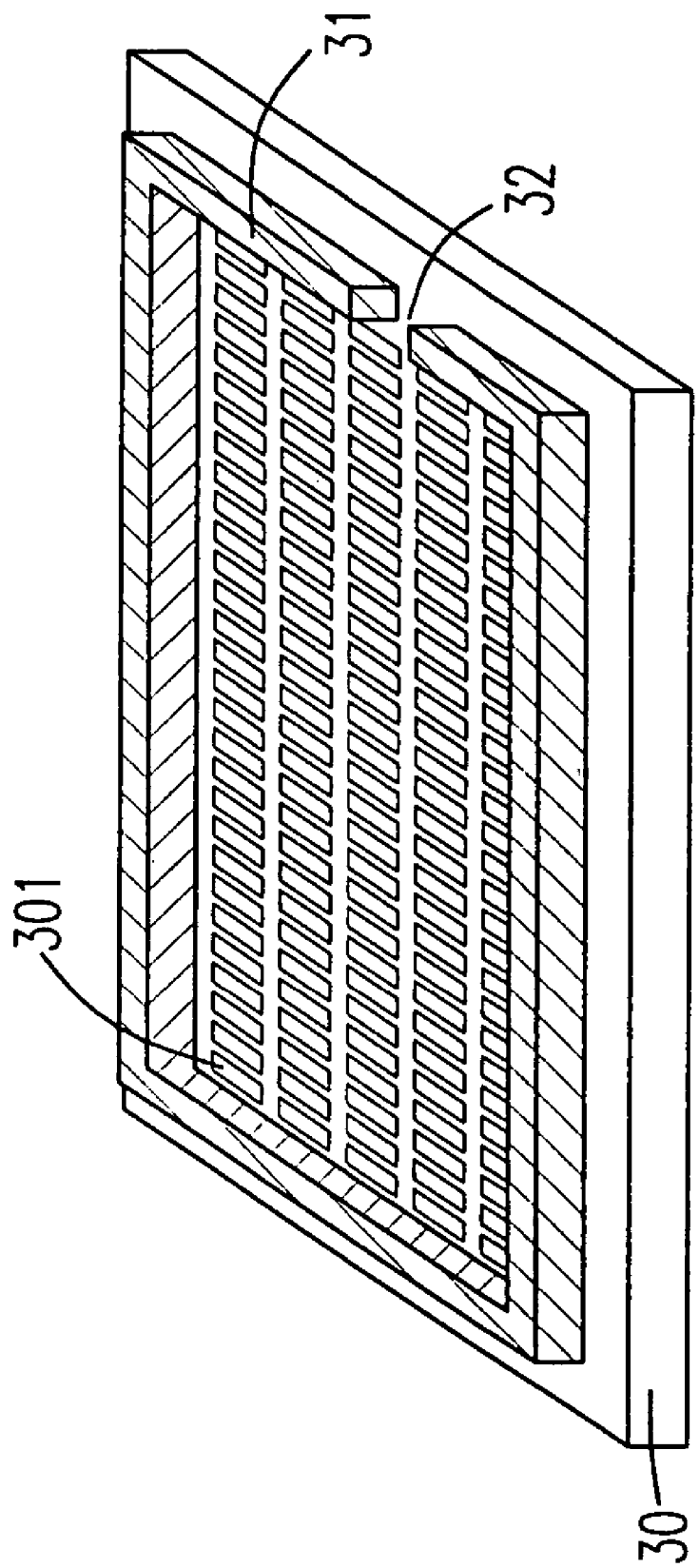
Figure 3C:
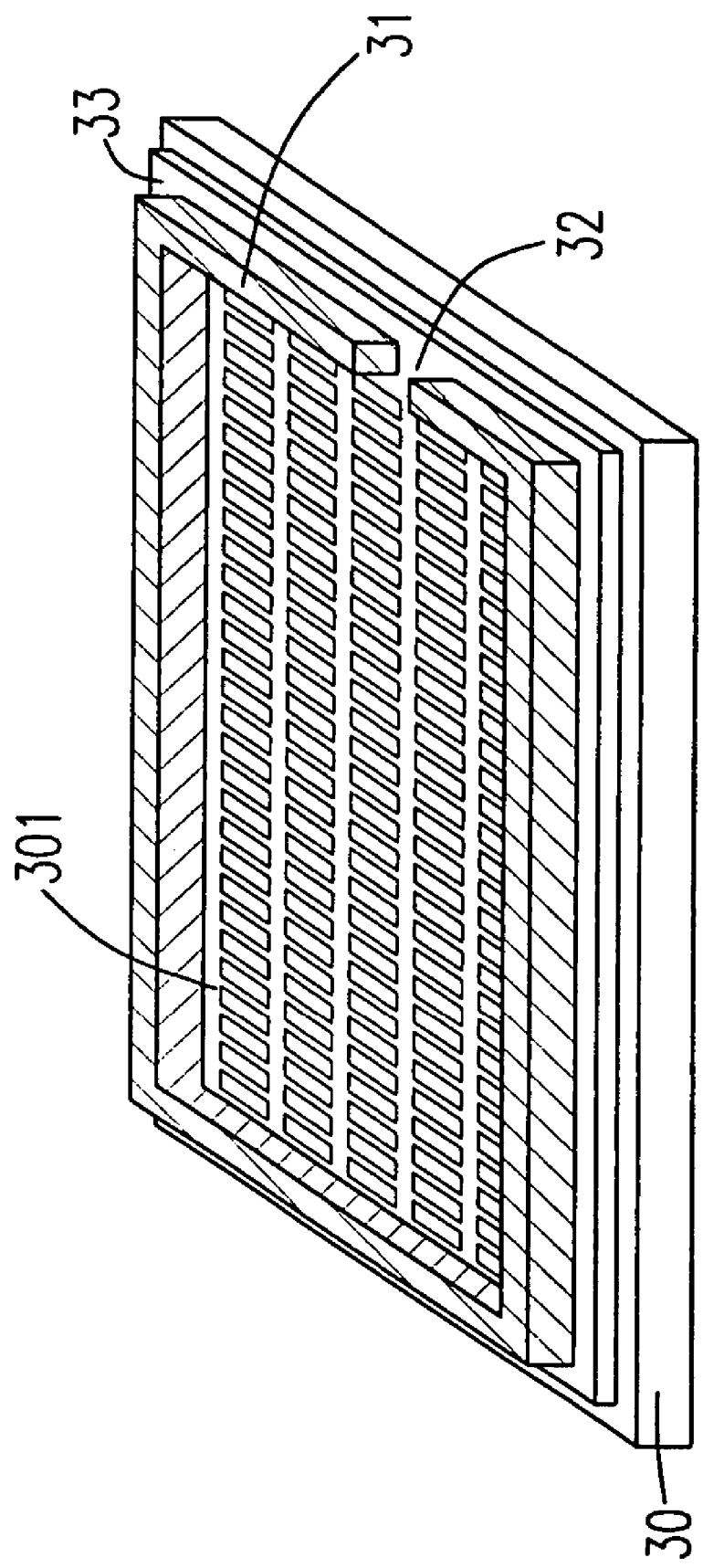
Figure 3D:
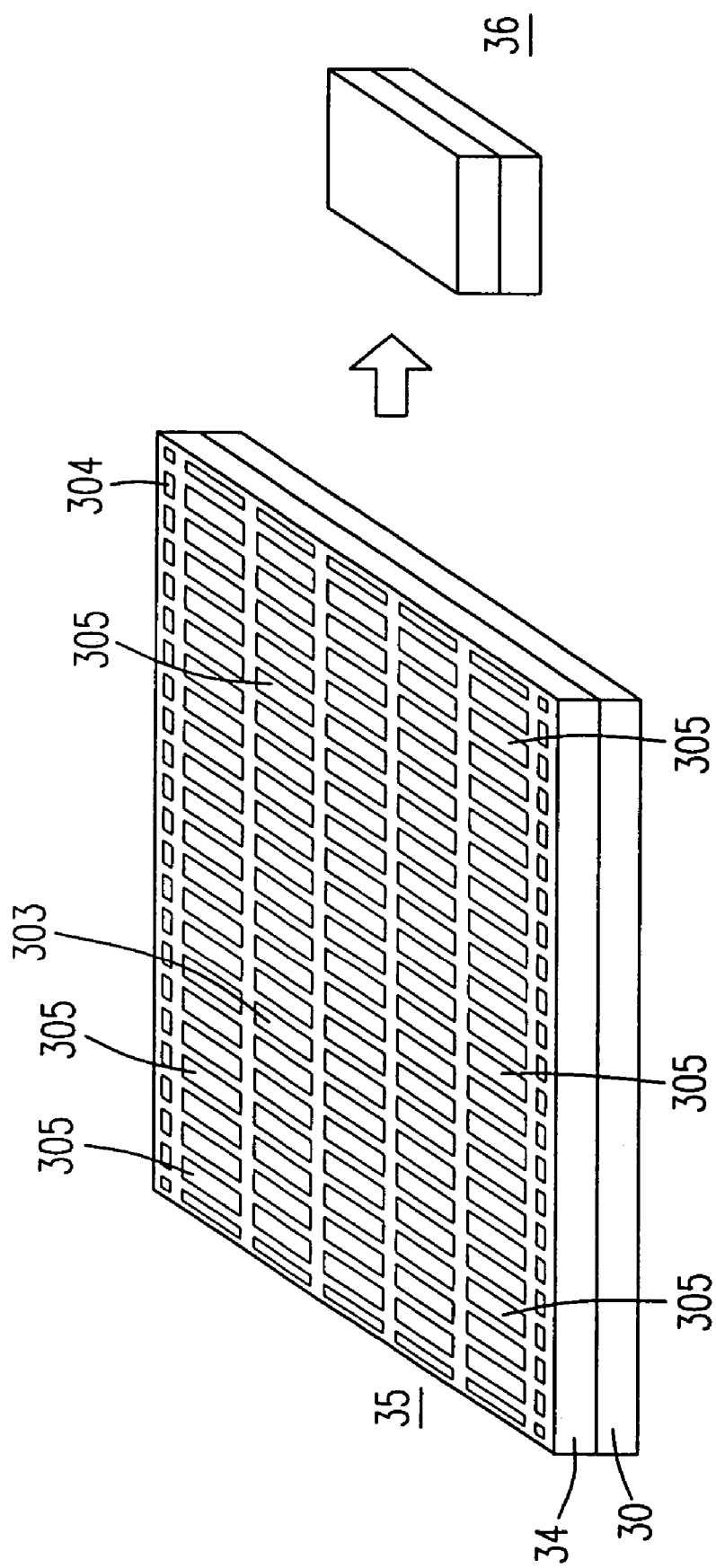

Please refer to FIG. 2, which is a cross-section view of the periphery of a large LC panel according to the prior art. The large LC panel 20 is composed of an upper substrate 21, a lower substrate 22, a liquid crystal 23, and a gasket seal 24. The distance $\lambda$ between the liquid crystal 23 and the gasket seal 24 on the periphery of the large LC panel 20 is usually above 0.3 mm.

For the distance $\lambda$ between the liquid crystal 23 and the gasket seal 24, a large value of $\lambda$ easily leads to a deformation 25 on the periphery of the large LC panel 20 shown in FIG. 2 (an exaggerated expression) after the upper substrate 21 is laminated upon the lower substrate 22. The circumstance is the main cause of the defect of bad tones of colors which lead to the phenomenon of yellow light, arising after the small LC panels are segmented from the large LC panel 20.

To eliminate the defect, a solution presented in this invention which focuses on the change of the gasket seal patterns is provided. Please refer to FIG. 3 (a), which is a side view of the patterns on the substrate of an LC panel.

The disposition of the patterns on the lower substrate 30 which is made of silicon is composed of m×n small panel patterns and 2m+2n gasket seal patterns. The m×n small panel patterns form a rectangle which has m small panel patterns in length and n small panel patterns in width. Besides, m and n are both positive integrals, and m is greater than n. The small panel patterns 301 and the gasket seal patterns 302 are formed by a screen printing process.

The main conception of the present invention is to limit the distance $\lambda$ between each of the small panel patterns 301 and each of the gasket seal patterns 302 to $0<\mu<0.25$ mm, so as to eliminate the deformation 25 on the periphery of the large LC panel 20 shown in FIG. 2.

As shown in FIG. 3 (b), with a photo resist and a lithography process, a mixture including a gasket seal is then coated on the gasket seal patterns 302 of the lower substrate 30 to form a side frame 31, including at least one slit 32, to surround the periphery of the small panel patterns 301. A curing process is performed to reinforce the hardness of the side frame 31.

As shown in FIG. 3 (c), a gasket seal is then coated on the side frame 31. By performing a lamination process, a transparent conductive layer 33, including indium tin oxide (ITO), is laminated on the lower substrate 30. A liquid crystal filling (LC filling) process is then performed to fill a cell gap between the lower substarte 30 and the transparent conductive layer 33 with liquid crystal.

Then, as shown in FIG. 3 (d), another substrate 34 (upper substrate) which is the same with the lower substrate 30 is provided and laminated on the structure shown in FIG. 3 (c). An end sealing process is performed to seal the slit 32 so as to form a large LC panel 35.

Finally, a realignment process is performed toward the large LC panel 35. According to the small panel patterns 303 on the large LC panel 35, a plurality of small LC panels 36 are formed by segmenting the large LC panel 35.

Figure 4:
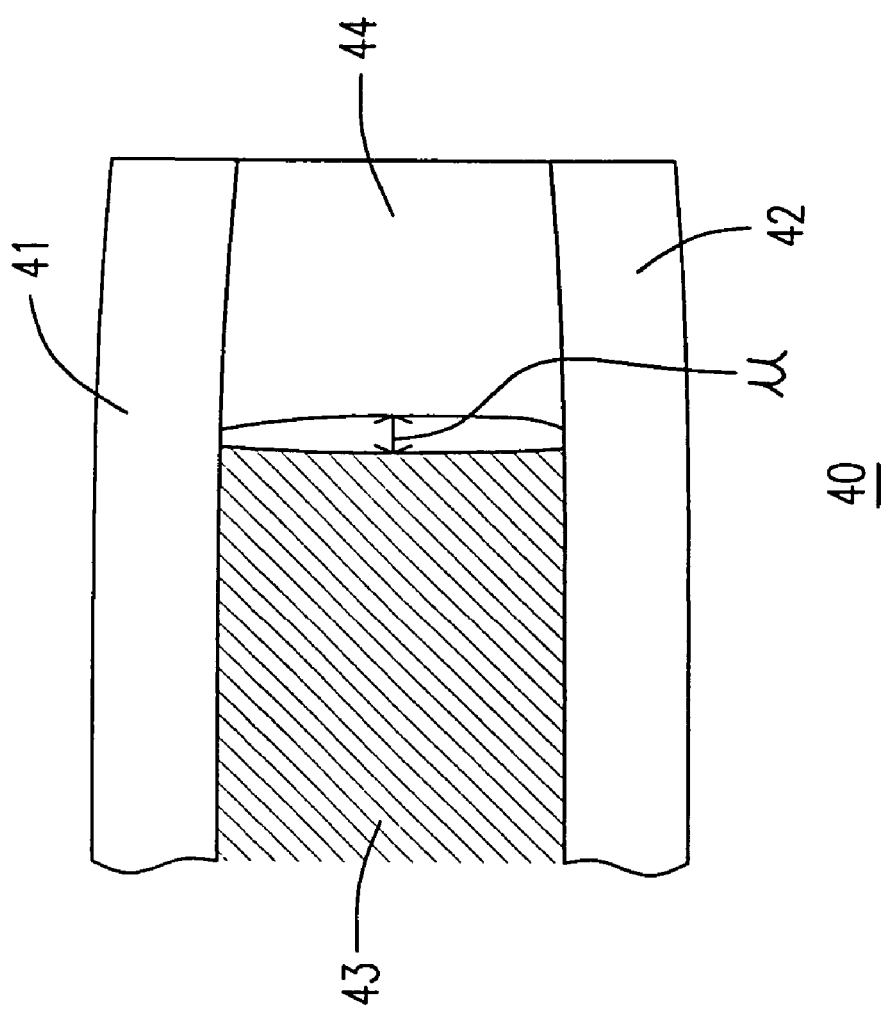
FIG. 4 is a cross-section view of the periphery of a large LC panel according to the present invention.

Please refer to FIG. 4, which is a cross-section view of the periphery of a large LC panel according to the present invention. The large LC panel 40 is composed of an upper substrate 41, a lower substrate 42, a liquid crystal 43, and a gasket seal 44. The distance $\lambda$ between the liquid crystal 43 and the gasket seal 44 on the periphery of the large LC panel 20 is set under 0.25 mm according to the present invention.

FIG. 4 concludes that the smaller value of $\mu$, between each of the gasket seal patterns and each of the panel patterns adjacent to the gasket seal patterns, makes the two substrates absorb the stress which leads to the deformation on the periphery on the large LC panel while the upper substrate 41 is laminated upon the lower substrate 42, so as to eliminate the defect of bad tones of colors, leading to the phenomenon of yellow light, which arised after the small LC panels are segmented from the large LC panel.

Although the former processes are performed with the side frame 31 with the slit 32, it is still practicable to perform them with a side frame without any slits. That is to say, the present invention can also be utilized in the modern fabrication process of an LC panel, in which a slit is not necessary any more.

Figure 5:
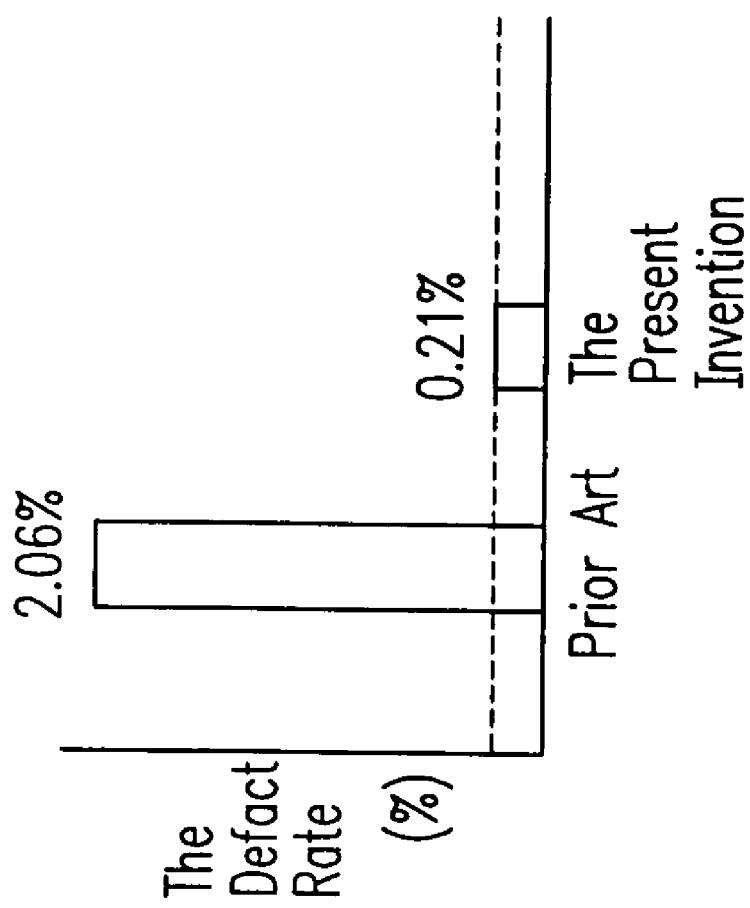
FIG. 5 is a table showing the comparison of the same model of the products produced by the LC panel fabrication methods presented in the prior art and the present invention.

Please refer to FIG. 5, which is a table showing the comparison of the same model of the products produced by the LC panel fabrication methods presented in the prior art and the present invention. From the table, it can be seen that, for the same type of the LC panel, the defect rate of the automatic fabricating process with the process with the change of the gasket seal patterns and the increase of the distance between the small panel patterns and the gasket seal patterns provided in the present invention is 0.21%, compared to the defect rate of 2.06% with the process of the prior art. That is, the present invention is able to improve the defect of bad tones of colors which leads to the phenomenon of yellow light by 89%. Therefore, the present invention is indeed a great contribution toward the tones of colors of an LC panel in the LC panel fabrication process.

The method for fabricating a liquid crystal panel according to the present invention indeed eliminates the defect of bad tones of colors and the phenomenon of yellow light, coming up in the small panel on the periphery of the large LC panel after the small LC panels are segmented. The present invention also increases the yield of the fabrication process of the small LC panel.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method for fabricating a liquid crystal (LC) panel, comprising steps of:
   (a) providing a first substrate and a second substrate respectively having m×n panel patterns and 2m+2n gasket seal patterns thereon, wherein a frame is formed by said gasket seal patterns to surround said panel patterns, said frame has m said gasket seal patterns in length and n said gasket seal patterns in width, and there is a distance μ between each of said gasket seal patterns and each of said panel patterns adjacent to said gasket seal patterns where 0<μ<0.25 mm;
   (b) forming a side frame on said frame;
   (c) forming a transparent conductive layer on said first substrate;
   (d) filling a gap between said first substrate and said transparent conductive layer with a liquid crystal;
   (e) placing said second substrate over said transparent conductive layer to form a first LC panel; and
   (f) segmenting said first LC panel according to each of said panel patterns to form m×n second LC panels.

2. The method according to claim 1, wherein said first substrate and said second substrate are both made of silicon.

3. The method according to claim 1, wherein m and n are both positive integrals, and m is greater than n.

4. The method according to claim 1, wherein said panel patterns and said gasket seal patterns are formed by a screen printing process.

5. The method according to claim 1, wherein a rectangle is formed with all said panel patterns, and said rectangle is m said panel patterns in length and n said panel patterns in width.

6. The method according to claim 1, wherein said side frame in said step (b) has at least one slit for filling said liquid crystal.

7. The method according to claim 6, wherein said step (e) comprises sealing said slit to form said first LC panel after placing said second substrate over said transparent conductive layer.

8. The method according to claim 1, wherein said step (b) comprises performing a lithography process with a photoresist to form said side frame.

9. The method according to claim 1, between said step (b) and said step (c) further comprising a step of: curing said side frame to reinforce a hardness thereof.

10. The method according to claim 9, wherein said transparent conductive layer is made of indium tin oxide (ITO).

11. The method according to claim 9, between said step (c) and said step (d) further comprising a step of: forming a gasket seal on said side frame.

12. The method according to claim 1, between said step (e) and said step (f) further comprising a step of: realigning said liquid crystal which is filled in said first LC panel.

13. A pattern disposition for a substrate of an LC panel, comprising:
   m×n panel patterns; and
   2m+2n gasket seal patterns,
   wherein a frame is formed by said gasket seal patterns to surround said panel patterns, said frame has m said gasket seal patterns in length and n said gasket seal patterns in width, and there is a distance μ between each of said gasket seal patterns and each of said panel patterns adjacent to said gasket seal patterns where 0<μ<0.25 mm.

14. The pattern disposition according to claim 13, wherein said substrate is made of silicon.

15. The pattern disposition according to claim 13, wherein m and n are both positive integrals, and m is greater than n.

16. The pattern disposition according to claim 13, wherein all said panel patterns and said gasket seal patterns are formed by a screen printing process.

17. The pattern disposition according to claim 13, wherein a rectangle is formed with all said panel patterns, and said rectangle has m said panel patterns in length and n said panel patterns in width.

* * * * *